March 8, 1966  J. F. CIRINO ETAL  3,238,551
CAR WASHING APPARATUS
Filed July 1, 1965 2 Sheets-Sheet 1
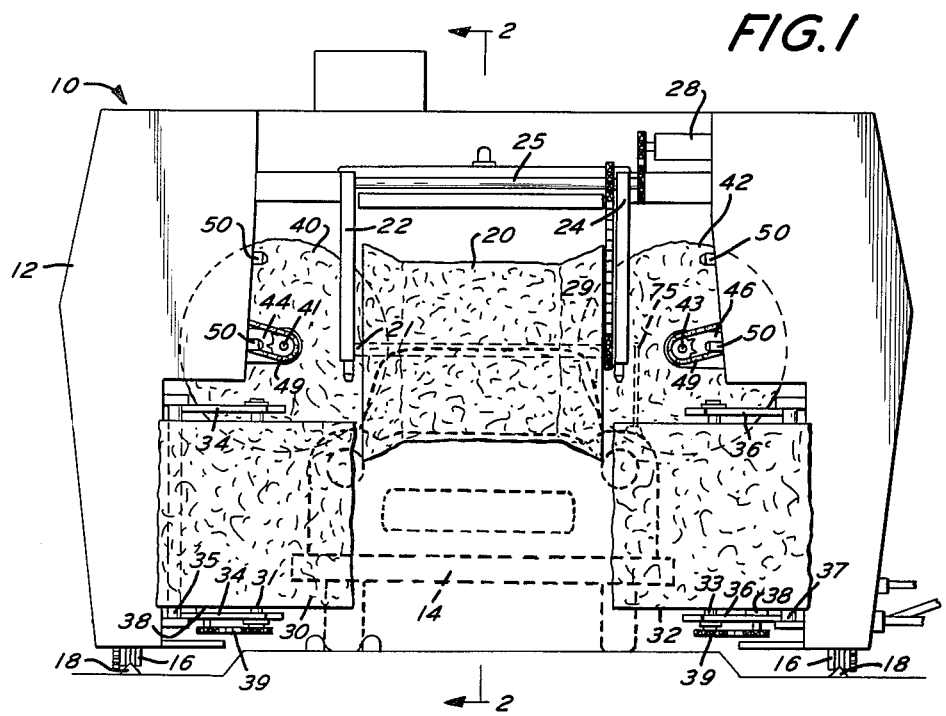
FIG.1
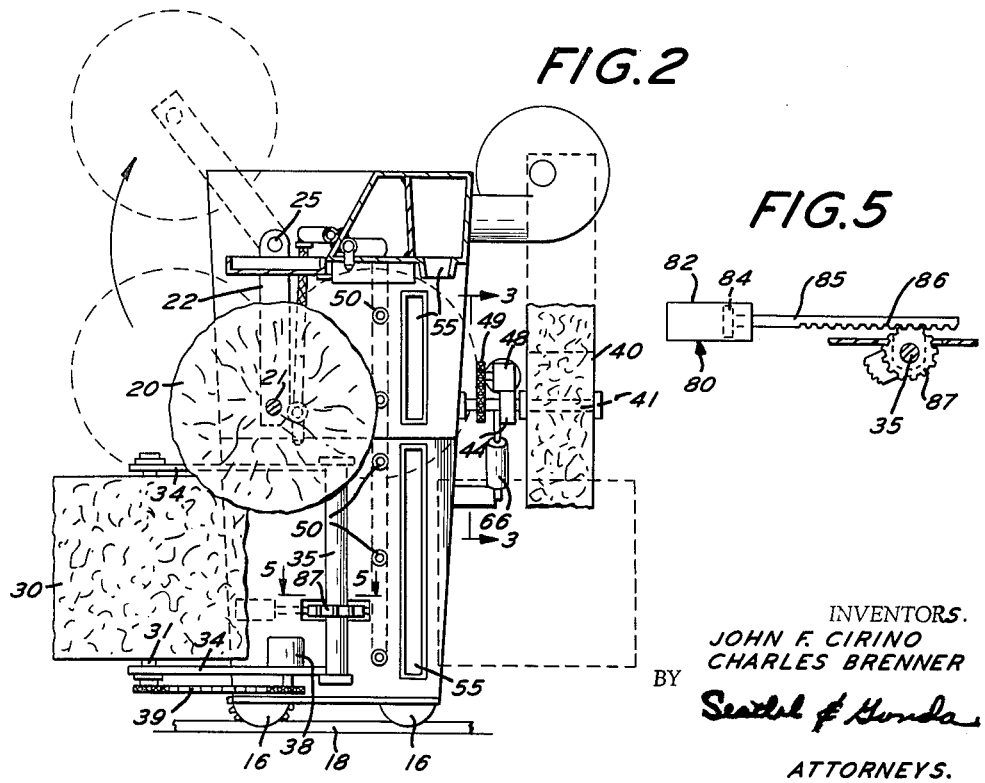
FIG.2
FIG.5
INVENTORS.
JOHN F. CIRINO
CHARLES BRENNER
BY
ATTORNEYS.

March 8, 1966 J. F. CIRINO ETAL 3,238,551
CAR WASHING APPARATUS

Filed July 1, 1965 2 Sheets-Sheet 2

INVENTORS
JOHN F. CIRINO
CHARLES BRENNER
BY

*Seidel & Gonda*

ATTORNEYS.

United States Patent Office 3,238,551
Patented Mar. 8, 1966

3,238,551
CAR WASHING APPARATUS
John F. Cirino, Churchville, and Charles Brenner, Overbrook Hills, Pa. (Both c/o Mr. Robot Inc., 301 City Line Ave., Bala Cynwyd, Pa.)
Filed July 1, 1965, Ser. No. 468,719
11 Claims. (Cl. 15—21)

This is a continuation-in-part of the subject matter disclosed in prior copending application Serial No. 364,987 filed May 5, 1964.

This invention relates generally to an apparatus for washing and drying a stationary automobile, and in particular, to a side and window washing component thereon.

Present-day car washing apparatus are manual or semi-automatic in operation and require human supervision and performance during some of the operations of the washing and drying cycles. In some instances, complete automatic operation has been precluded because of possible damage to a projecting radio antenna on the car. Furthermore, because of the passenger cars' diverse configuration, presenting surfaces at varied dispositions, a complete and thorough washing by automatic machinery has not always been feasible.

Another object of this invention is to provide a coin operated automatic car washing apparatus which reciprocates relative to a stationary automobile for washing and drying the automobile without manual intervention.

An object of this invention is to provide a car washing machine which thoroughly and completely washes all the diverse surfaces of a car.

A further object of this invention is to provide a side and window washing component for a car washing machine which will not damage the car by snapping off a projecting radio antenna.

Other objects will appear in the disclosure which follows hereinafter.

For the purpose of illustrating the invention, there is shown in the drawings a form which is presently preferred; it being understood, however, that this invention is not limited to the precise arrangements and instrumentalities shown.

Further and other objects and a fuller understanding of the invention may be had by referring to the following description and claims, taken in conjunction with the accompanying drawings, in which:

FIGURE 1 is an elevational front view showing the car washing machine of the present invention.

FIGURE 2 is a sectional view taken substantially along the plane indicated by the line 2—2 of FIGURE 1.

FIGURE 5 is an enlarged partial view of FIGURE 2 taken in the direction of line 5—5.

Figure 3:
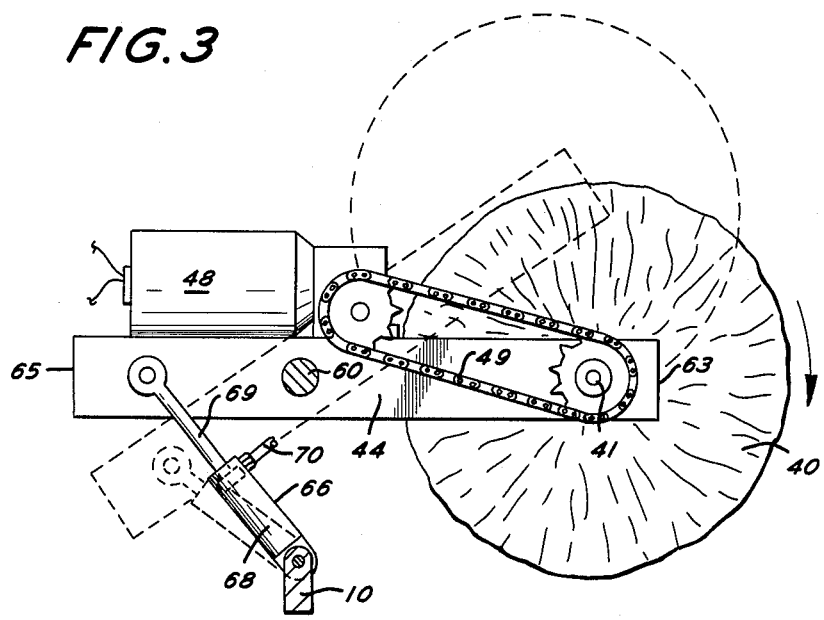
FIGURE 3 is an enlarged partial view of FIGURE 2 taken in the direction of line 3—3.

Referring to the drawings in detail, wherein like numerals indicate like elements, there is shown in FIGURE 1 a drawing of the car washing machine of the present invention. The machine 10 provides a support frame 12 having a generally inverted U-shaped configuration to accommodate the passage therethrough of a car 14 (shown in phantom). The support structure 12 is seated upon wheels 16 which roll along guide rails 18.

A rotary brush 20 is supported from the top of the support structure 12 by the brackets 22, 24. As illustrated, the brush 20 rotates about a horizontal shaft 21 which is journaled between ends of brackets 22, 24. A pivot shaft 25 passes through the opposite ends of brackets 22, 24 for a pivotal connection to the support structure 12. An electrical motor 28 is mounted on the frame 12 to drive the shaft 25, as illustrated. A drive chain 29 is provided around appropriate sprockets of the shaft 25 and shaft 21.

A first pair of rotary brushes 30, 32 are mounted at each side of the support structure 12 for rotation about the vertical shafts 31, 33. The shafts 31, 33 are journaled between ends of the pairs of brackets 34, 36. The opposite ends of the pairs of brackets 34, 36 are attached, respectively, to the pivot shafts 35, 37 which are journaled at each side of the support structure, as illustrated in FIGURE 1.

Spray nozzles 50 and drying vents 55 are spaced about the interior of the support structure 12. A more detailed and specific description of the washing machine may be had, if desired, by reference to the aforementioned copending application.

A second pair of rotary brushes 40, 42 turn about the horizontal shafts 41, 43 journaled at one end of the brackets 44, 46, respectively. A motor 48 is mounted on each bracket 44, 46 and a chain 49 around suitable sprockets of the motor and shaft 41 provides a suitable drive means. Each of the pair of brushes 40, 41 and their associated support members and drive means are identical, therefore, further description thereof shall be confined to one of the pair, it being understood that the remaining one is identical.

Figure 4:
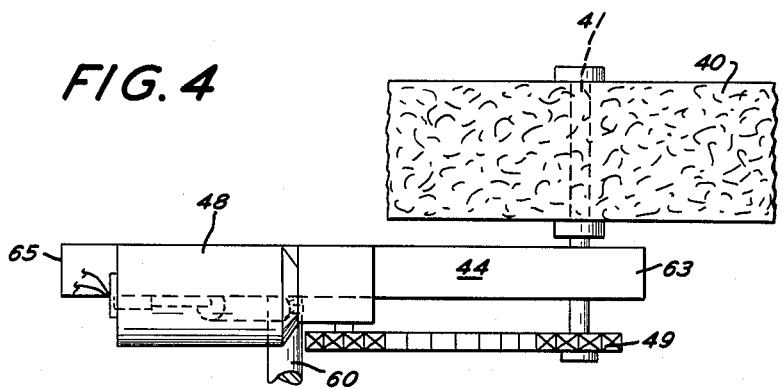
FIGURE 4 is a plan view of FIGURE 3.

With reference to the enlarged views of FIGURES 3 and 4, it may be seen that the horizontal shaft 41 of brush 40 is journaled at end 63 of the bracket 44. A pivot rod 60 passes through the bracket 44 at a point proximate the midpoint thereof. The shaft 60 is parallel to the rotary brush shaft 41 and is journaled in the support structure 12 at a horizontal disposition paralleling the direction of the longitudinal pass by the car 14 as provided by the guidance of rails 18. The motor 48 is mounted at one side of the shaft 60 and provides a counterweight to the brush 40.

A fluid ram 66 is pivoted between the end 65 of bracket member 44 and the support structure 12. The ram 66 is of a conventional type, such as an air cylinder, having a piston rod 69 and a cylinder 68. A fluid conduit 70 communicates with a source of pressurized fluid for selective activation of the fluid ram 66 in a manner well known in the art.

Washing of the car 14 is accomplished by a series of longitudinal passes thereby of the machine 10, which rolls on wheels 16 along rail 18. During the passes, cleansing fluid and rinsing fluid is dispensed through the nozzles 50 while the brushes are rotated to wipe against surfaces of the car 14 for a washing thereof. Later, a drying circulation through vents 55 dries the car 14. A more complete description of the operational washing, rinsing and drying cycles of the machine 10 is contained in the aforesaid copending application. The horizontally disposed rotary brush 20 swings about the pivot shaft 25 to provide a vertical displacement thereof accommodating the diverse upper surfaces of a car, such as the hood, roof and trunk. In a like manner, the vertically disposed pair of brushes 40, 41 swing about the vertical pivot shafts 35, 37, respectively, to provide a horizontal displacement thereof. In this manner, the brushes 40, 41 swing together for a washing of the front vertical surfaces of the car 14. Then the brushes 40, 41 swing apart for a washing of the vertical surfaces at the opposite sides of the car 14. Then, brushes 40, 41 swing together at the back of the car 14 for a washing of the back vertical sides thereof also.

Modern cars have inclined surfaces between the uppermost surfaces and the vertical side surfaces, such as those surfaces formed by the side window panels. These surfaces are often difficult to thoroughly wash by means of machinery. The second pair of brushes 40, 42 is provided for washing those surfaces between the uppermost and vertical side surfaces of a car 14. Since the pair of brushes 40, 41 turn on shafts 41, 43 which are horizontally disposed and parallel to the direction of the longitudinal pass by the car 14, they may be swung inward on pivot shaft 60 to perform a thorough washing of the inclined surfaces between the uppermost and side surfaces of car 14. Normally the weight of motor 48 provides a sufficient counterweight for a gravitational bias of the brushes 40, 41 to their uppermost positions. The brushes 40, 41 are swung downward into operational position by energizing and extending the fluid ram 66 to their full length. The motors 48 are energized to rotate the brushes 40, 41 through the drive means provided by the chains 49. It is to be noted that the brushes rotate to wipe against the inclined surfaces in a vertical direction. In this manner, the brushes will wipe in a direction paralleling a vertical antenna and thereby avoid bending or breaking it off.

An extension and retraction means, such as fluid ram 80, is also provided for each of the brushes 30, 32, so that these brushes may also be retracted during rinse and dry cycles. With reference to FIGURE 5, the fluid ram 80 is of a conventional type employing a cylinder 82 and a piston 84. The piston has a rod 85 including a rack 86 therealong. A pinion 87 is provided on the pivot shaft for engagement with the rack 86. The cylinder 82 of the fluid ram 80 is pivoted on the frame 12. Thus, expansion and contraction of the ram 80 will cause the rack 86 to turn the pinion 87 and the pivot shaft 35. In this manner the brushes 30, 32 may be swung into engagement for washing and also be retracted during the rinse and dry cycles. It is, of course, clearly visualized that the second pair of brushes 40, 42 are also, as described before, easily extended for a thorough washing of surfaces heretofore not accessible to prior car washing machines and without damage to a projecting radio antenna thereat.

The present invention may be embodied in other specific forms without departing from the spirit or essential attributes thereof and, accordingly, reference should be made to the appended claims, rather than to the foregoing specification as indicating the scope of the invention.

We claim:

1. An apparatus for washing a car by a longitudinal pass thereby, comprising: a support structure; a rotary brush substantially horizontally supported by said structure for washing upper surfaces of said car; a first pair of rotary brushes spaced apart and substantially vertically supported by said structure for washing vertical surfaces of said car; a second pair of rotary brushes spaced apart and substantially horizontally supported by said structure for washing surfaces of said car between said upper and vertical surfaces; means to supply cleansing and rinsing liquid for application over said car; and means to rotate said brushes for wiping against said surfaces and washing said car.

2. An apparatus in accordance with claim 1 wherein said structure is mobile for passes by a stationary car.

3. An apparatus in accordance with claim 1 wherein said second pair of rotary brushes have rotational axes paralleling the direction of said longitudinal pass.

4. An apparatus for washing a car by a longitudinal pass thereby, comprising: a support structure of inverted U-shaped configuration accommodating passage of a car therethrough, said structure being mobile for passes by a stationary car; a rotary brush; a first means on said structure to substantially horizontally support said brush with a substantially horizontal axis of rotation and allowing a vertical displacement of said brush for washing diverse upper surfaces of said car; a first pair of rotary brushes; a second means on said structure to substantially vertically support said first pair of brushes with substantially vertical axes of rotation and allowing horizontal displacement of said first pair of brushes for washing diverse vertical surfaces at opposite sides of said car; a second pair of rotary brushes; a third means on said structure to substantially horizontally support said second pair of brushes with spaced apart and substantially horizontal axes of rotation and allowing substantially vertical and substantially horizontal displacement of said second pair of brushes for washing diverse surfaces of said car between said upper and vertical surfaces; means to supply cleansing and rinsing liquid for application over said car; and means to rotate said brushes for wiping against said surfaces and washing of said car.

5. An apparatus in accordance with claim 4 wherein said first, second and third means include brackets pivoted on said support, with all of said rotational axes being journaled in said brackets, which may be swung with respect to said structure for said respective horizontal and vertical displacements of all said brushes.

6. An apparatus in accordance with claim 4 wherein, with respect to the direction of said longitudinal pass, said brush having a rotational axis which is substantially perpendicular to the rotational axes of said first pair of brushes and said second pair of brushes have substantially parallel rotational axes with respect to each other.

7. On a car washing machine, an apparatus for washing upper side surfaces of a car without damage to a protruding antenna thereat, comprising: a bracket pivoted on said machine; a rotary brush journaled at one end of said bracket, with an axis of rotation at a horizontal disposition paralleling said side surfaces of said car; means to swing said bracket for a vertical and horizontal displacement of said brush with respect to said machine; and means to rotate said brush for wiping against said upper surfaces while rotating about said axis.

8. On a car washing machine, an apparatus for washing upper side surfaces of a car without damage to a protruding antenna thereat, comprising: a bracket-lever pivoted on said machine at a point between opposite ends of said bracket; a rotary brush having a shaft journaled at one of said bracket ends with an axis of rotation at a horizontal disposition paralleling said side surfaces of said car; a fluid ram pivoted between said machine and an end of said bracket remote from said brush, said ram swinging said bracket for vertical and horizontal displacement of said brush with respect to said machine; an electric motor mounted on said bracket at a side of said point remote from said brush to provide a counterweight thereat; and a drive means between said motor and brush providing rotation of said brush for a vertical wiping against said upper surfaces, said vertical wiping parallel, said antenna and preventing damage thereto.

9. A pair of apparatus in accordance with claim 8, said pair spaced on said machine for a simultaneous washing of opposite sides of a car.

10. An apparatus in accordance with claim 8 wherein said counterweight is heavier than said brush providing a gravitational biasing of said brush in an upward direction.

11. An automataic apparatus in accordance with claim 4 including a means for extending and retracting said first pair of brushes during a respective washing and drying cycle, said extending and retraction means having a pinion means for turning said second support means and a fluid ram with a rack engaging said pinion, said ram selectively operating to extend and retract said first pair of brushes.

References Cited by the Examiner
UNITED STATES PATENTS 2,579,866  12/1951  Rousseau _____ 15—21
2,774,980  12/1956  Morison et al. _____ 15—21

FOREIGN PATENTS 617,409  8/1935  Germany.

CHARLES A. WILLMUTH, *Primary Examiner.*

EDWARD L. ROBERTS, *Assistant Examiner.*